United States Patent [19]

Christiansen et al.

[11] Patent Number: 5,098,681
[45] Date of Patent: Mar. 24, 1992

[54] PROCESS FOR ABSORPTION OF SULFUR COMPOUNDS FROM FLUIDS

[75] Inventors: Steven H. Christiansen, Richwood; Dane Chang, Houston; Druce K. Crump, Lake Jackson, all of Tex.

[73] Assignee: The Dow Chemical Company, Midland, Mich.

[21] Appl. No.: 569,120

[22] Filed: Aug. 16, 1990

[51] Int. Cl.$^5$ .............................................. C01B 17/00
[52] U.S. Cl. .................................................... 423/243
[58] Field of Search ............................. 423/245.2, 243

[56] References Cited

U.S. PATENT DOCUMENTS

| | | | |
|---|---|---|---|
| 2,649,450 | 8/1953 | Strong et al. | 544/231 |
| 3,856,921 | 12/1974 | Shrier et al. | 423/228 |
| 3,966,711 | 6/1976 | Rasberger | 540/492 |
| 4,080,423 | 3/1978 | Smith et al. | 423/243 |
| 4,100,256 | 7/1978 | Bozzelli et al. | 423/220 |
| 4,112,049 | 9/1978 | Bozzelli et al. | 423/226 |
| 4,366,134 | 11/1982 | Korosy et al.l. | 423/243 |
| 4,388,281 | 6/1983 | Holter et al. | 423/243 |
| 4,465,614 | 8/1984 | Trentham et al. | 252/364 |
| 4,469,663 | 9/1984 | Crump et al. | 423/242 |
| 4,530,704 | 7/1985 | Jones et al. | 55/48 |
| 4,767,860 | 8/1988 | Dunmore et al. | 544/384 |
| 4,783,327 | 11/1988 | Treybig et al. | 423/243 |
| 4,814,443 | 3/1989 | Treybig et al. | 540/492 |

FOREIGN PATENT DOCUMENTS

| | | | |
|---|---|---|---|
| 396020 | 10/1931 | United Kingdom | 423/243 |
| 450519 | 1/1935 | United Kingdom | |

OTHER PUBLICATIONS

Kirk-Othmer, Encyclopedia of Chemical Technology, Cyclic Amines, vol. 2, pp. 295–299, 1978.
Kirk-Othmer, Encyclopedia of Chemical Technology, Cyanoethylation, vol. 7, p. 374, 1979.
W. V. Drake et al., The Reaction of Organic Halides with Piperidine IV Bromo Esters, J. Am. Chem. Soc., vol. 56, pp. 697–700 (1934).

*Primary Examiner*—Gregory A. Heller

[57] ABSTRACT

Sulfur dioxide is removed from a fluid containing $SO_2$ by employing as an absorbent therefor an aqueous solution of compounds represented by Formulas I and II:

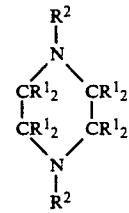

Formula I wherein each $R^1$ or $R^2$ is independently hydrogen; an alkyl group; a hydroxyalkyl group; an aldehyde group; a carboxylic acid or salt group; an alkyl group containing at least one carboxylic ester, carboxylic acid or salt, ether, aldehyde, ketone or sulfoxide; and wherein at least one $R^1$ or $R^2$ is a carbonyl-containing group, such as an aldehyde group, a carboxylic acid containing group, a carboxyl ester group, or a ketone-containing group;

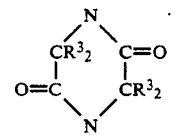

Formula II wherein each $R^3$ is independently hydrogen; an alkyl group; a hydroxyalkyl group; an aldehyde group; a carboxylic acid or salt group; or an alkyl, aryl, or aralkyl group containing at least one carboxylic ester, a carboxylic acid or salt, ether, aldehyde, ketones or sulfoxide group. The absorbent solution preferably can be thermally regenerated by heating to remove $SO_2$.

22 Claims, No Drawings

PROCESS FOR ABSORPTION OF SULFUR COMPOUNDS FROM FLUIDS

BACKGROUND OF THE INVENTION

This invention relates to a method for removing sulfur compounds from gaseous streams. More particularly, it relates to a method for removing sulfur compounds including sulfur dioxide ($SO_2$) from fluids.

Removal of such sulfur compounds as sulfur dioxide, e.g. from fluids such as industrial and utility gas emissions, is increasingly important. Acid rain is believed to occur when sulfur dioxide in such emissions undergoes chemical changes in the atmosphere and returns to earth with precipitation.

There are numerous techniques for removing sulfur compounds from gas streams containing them. One common process employs limestone scrubbing. The disadvantage of this process is the necessity of disposing of the large volume of solid waste produced. The wastes are not generally recycled. Another system, taught in U.S. Pat. No. 4,366,134, employs potassium or sodium citrate to selectively remove $SO_2$ from a gas stream. While the wastes from this process can be recycled, recycle is expensive because thermally stable salts are formed and require higher heat for regeneration.

More recent patents teach the use of certain piperazinone derivatives. For instance, U.S. Pat. No. 4,112,049 teaches use of certain piperazinones and N,N'-alkyl piperazinone. In another patent, U.S. Pat. No. 4,530,704, the removal of $SO_2$ from a gas stream is accomplished by contacting a gas stream containing it with an aqueous solution of a piperazinone, morpholinone or N-alkyl substituted derivatives thereof, e.g. N,N'-dimethyl-2-piperazinone. In U.S. Pat. No. 4,783,327 certain hydroxyalkyl substituted piperazinones are taught for use in a similar manner.

It would be advantageous to have a process for removal of sulfur compounds such as sulfur dioxide which employs an aqueous solvent and uses an absorbent which has a high capacity for absorbing sulfur dioxide. The absorbent would desirably be regenerable. It is also desirable that this absorbent has adequate water compatibility at ambient or higher temperatures and its salts are water soluble to avoid inducing sealing or plugging of plant equipment.

SUMMARY OF THE INVENTION

The present invention is a method for removing $SO_2$ from a fluid containing $SO_2$ by employing as an absorbent for $SO_2$ an aqueous solution of at least one compound represented by Formula I or Formula II.

DETAILED DESCRIPTION OF THE INVENTION

The compounds useful as absorbents for removing $SO_2$ from fluids include piperazines having carbonyl groups, preferably compounds of Formula I:

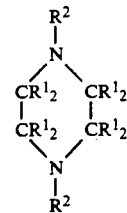

Formula I wherein each $R^1$ or $R^2$ is independently hydrogen; an alkyl group; a hydroxyalkyl group an aldehyde group; a carboxylic acid or salt group; an alkyl group containing at least one carboxylic ester, carboxylic acid or salt, ether, aldehyde, ketone or sulfoxide; and wherein at least one $R^1$ or $R^2$ is a carbonyl-containing group, such as an aldehyde group, a carboxylic acid containing group, a carboxyl ester group, or a ketone-containing group.

In each of the possible $R^1$ or $R^2$ groups, each alkyl group is of a size or molecular weight suitable for use in absorbing sulfur dioxide, preferably in aqueous solutions. Preferably each alkyl group, including the substituted groups such as hydroxyalkyl groups, have from 1 to about 12 carbon atoms, more preferably, from 1 to about 6 carbon atoms. Each alkyl group is suitably cyclic, branched or unbranched and optionally is at least partially unsaturated (alkylene), e.g. vinyl or allyl groups or substituents.

In Formula I each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, ketones; and sulfoxides.

Preferred substituents, $R^1$ or $R^2$, on compounds of Formula I are those which enhance solubility in water, preferably without decreasing the capacity for absorbing $SO_2$, the regenerability of the compound after absorption, or the chemical and heat stability under conditions of use. Preferred substituents are generally hydrogen, formyl groups, alkyl groups and groups having at least one hydroxyl or carboxylic acid or salt group, more preferably alkyl groups unsubstituted or having such substituents, most preferably alkyl groups having at least one hydroxyl group, that is hydroxyalkyl groups. When $R^1$ or $R^2$ include a salt, the salt suitably has any counterion which allows water solubility, preferably such a metal cation, more preferably an alkali metal counterion, or mixtures thereof.

Preferred compounds among compounds of Formula I include piperazines having at least one carbonyl-containing substituent on the ring nitrogen and/or on at least one ring carbon atom; compounds wherein $R^2$ is other than hydrogen, more preferably a carbonyl-containing group, most preferably a formyl or carboxylate group; compounds in which at least one carbonyl group is on a carbon atom within 1, more preferably adjacent to the nitrogen; compounds having more than one oxygen atom, more preferably more than one carbonyl oxygen. Formyl groups on nitrogen generally enhance regenerability, while carboxylic acids and salts generally enhance absorption of SO₂.

Exemplary of the compounds of Formula I are piperazines such as ethyl-1-piperazine carboxylate; 1,4-piperazine-dicarboxylic acid; 1-succinylpiperazine; 1-formyl piperazine, 4-formylpiperazine; 1,4-diformylpiperazine; 1-formyl-2-methyl-piperazine; 1-formyl-2,5- dimethylpiperazine; 1-(2-hydroxyethyl)-4-sulfoxyl piperazine and the like. Preferred compounds include ethyl-1-piperazine carboxylate: 1,4-diformylpiperazine; and 1-succinylpiperazine.

Such piperazines are commercially available and are known in the art. They are prepared by methods within the skill in the art, for instance by processes taught in Kirk-Othmer *Encyclopedia of Chemical Technology*, vol. 2, pp 295–299 (1978).

Compounds also useful as absorbents for removing SO₂ from fluids include anhydrides of monocarboxylic amino acids (hereinafter anhydrides) preferably compounds of Formula II.

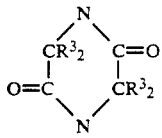

Formula II wherein each R³ is independently hydrogen; an alkyl group; a hydroxyalkyl group: an aldehyde group; a carboxylic acid or salt group; or an alkyl, aryl, or aralkyl group containing at least one carboxylic ester, a carboxylic acid or salt, ether, aldehyde, ketones or sulfoxide group.

In each of the possible R³ groups, each alkyl group is of a size or molecular weight suitable for use in absorbing sulfur dioxide, preferably in aqueous solutions. Preferably each alkyl group, including the substituted groups such as hydroxyalkyl groups, have from 1 to about 12 carbon atoms, more preferably, from 1 to about 6 carbon atoms. Each alkyl group is suitably cyclic, branched or unbranched and optionally is at least partially unsaturated (alkylene), e.g. vinyl or allyl groups or substituents.

In Formula II, each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldehydes, esters, acids, salts and ketones; and sulfoxides.

Preferred substituents, R³, on compounds of Formula II are those which enhance solubility in water, preferably without decreasing the capacity for absorbing SO₂, the regenerability of the compound after absorption, or the chemical and heat stability under conditions of use. Preferred substituents are generally hydrogen, formyl groups, alkyl groups and groups having at least one hydroxyl or carboxylic acid or salt group, more preferably alkyl groups unsubstituted or having such substituents, most preferably alkyl groups having at least one hydroxyl group, that is hydroxyalkyl groups. Where R³ includes a salt, the salt suitably has any counterion which allows water solubility, preferably such a metal cation, more preferably an alkali metal counterion, or mixtures thereof.

Preferred compounds among compounds of Formula II include anhydrides produced from amine-containing acids, such as glycine anhydride, 1,4-dimethyl-2,5-piperazinedione and the like.

Exemplary of preferred anhydrides are 2,5-piperazinedione (glycine anhydride); 1-methyl-2,5-piperazinedione; 1,4-dimethyl-2,5-piperazinedione: 1-(2-hydroxyethyl)-2,5-piperazinedione; 1,4-bis(2-hydroxyethyl)-2,5-piperazinedione; 1-(2-hydroxyethyl)-4-methyl-2,5-piperazinedione; 4-(2-hydroxyethyl)-2,5-piperazinedione; 1-(2-hydroxyethyl)-3-methyl-2,5-piperazinedione; 1,3,4,6-tetramethyl-2,5-piperazinedione; 1-(2-hydroxyethyl)-3,3-dimethyl-2,5-piperazinedione; 1,4-bis(2-hydroxyethyl)-3,3-dimethyl-2,5-piperazinedione; 1,4-bis(2-hydroxyethyl)-3,3,6,6-tetramethyl-2,5-piperazinedione; 1-butyl-2,5-piperazinedione; 1,4-dibutyl-2,5-piperazinedione: 3,3'-dibutyl-2,5-piperazinedione and the like. Preferred compounds include 2,5-piperazinedione and 1,4-dimethyl-2,5-piperazinedione.

Such anhydrides are commercially available and are known in the art. They are prepared by methods within the skill in the art, for instance by processes taught in *Synthetic Methods of Organic Chemistry*, W. Theilheimer, Vol. 13, p. 224 (1959).

Among compounds of Formula I and II, absorbent compounds having high boiling points relative to water are desirable to prevent overhead loss of the absorbent during a thermal regeneration step.

Among compounds of Formulas I and II, preferred compounds are those which have a capacity for absorbing SO₂ which, in combination with the water solubility, is suitable for use in aqueous solutions for absorbing SO₂. The capacity for absorbing SO₂ is determined by saturating a solution of a known concentration of the absorbent in water with SO₂, e.g. by sparging SO₂ (preferably in a mixture simulating that found in e.g. smokestacks) into the solution. Sparging is continued until the solution has absorbed a maximum amount of SO₂ (saturation). Then the concentration of bisulfate (including sulfite that may be present) and bisulfate (including sulfate) ions are determined, e.g. using a standardized commercially available ion chromatograph unit. Such determinations are within the skill in the art and are exemplified in Examples of this invention. Capacity is calculated as the mole ratio of absorbed SO₂ (as measured by the sum of the moles of bisulfate and bisulfate) to absorbent compound.

The capacity for absorbing SO₂ is considered in combination with the water solubility of the compound because the absorbing capacity of a solution is the capacity of the absorbent multiplied by the amount of absorbent present. An arbitrary parameter CS defined as:

$$CS = [\text{Capacity in (moles SO}_2/\text{moles absorbent)}] \times (\text{Solubility in moles absorbent/liter at 23° C.})$$

is determined for a potential absorbent. Absorbents used in the practice of the invention preferably have a CS of at least about 0.05, more preferably at least about 0.5, most preferably at least about 0.7 moles SO₂/ liter at 23° C.

The compounds used in the present invention are employed in aqueous solution at a concentration of from about 0.1 weight percent in water up to about their saturation concentration in water at the temperature at which the absorber is operated. The absorbent solution, after use, is preferably thermally regenerated, e.g. by passing steam through the solution, and recycled to the absorption step. The absorber can be operated at a temperature of from about 0° to about 120° C., but is preferably operated at a temperature of from about 5° to about 75° C., most preferably at from about 5° to about 60° C.

Pressures of from about atmospheric to about 10 atmospheres can be employed, but about atmospheric (e.g. 0 to 10 pounds per square inch gauge (psig) (0 to 68.95 pascals (PA)) pressure is preferably and conveniently employed. Higher temperatures and pressures are not deleterious so long as they are below the decomposition conditions of the absorbent, but equipment design modifications may be required to allow for pressure and temperature resistance. Fluids being treated in the practice of this invention suitably contain any amount of $SO_2$, e.g. from about one ppm (parts per million) (by volume) up to about 100 volume percent, preferably from about 100 ppm to about 3000 ppm (by volume).

Thermal regeneration of the absorbent suitably takes place at any temperature below the thermal decomposition temperature of the absorbent compound, preferably at a temperature of from about 75° C. to about 150° C., most preferably from about 90° C. to about 120° C., at atmospheric pressure. Reduced pressure of pressures above atmospheric are suitable, but about atmospheric (e.g. 0 to 10 pounds per square inch gauge (psig) (0 to 68.95 pascals (PA)) is convenient. Regeneration at about 100° C. at atmospheric pressure is particularly convenient because water in the aqueous solution boils and can be refluxed while the $SO_2$ is released.

Regenerability of an absorbent is a measure of the ability of the absorbent to release $SO_2$ (so that the absorbent may be reused). Regenerability is determined by measuring the bisulfate and bisulfate concentrations in a solution of known concentration of absorbent which has been saturated with $SO_2$ as in the determination of $SO_2$ absorption capacity. This solution is referred to herein as the enriched solution. Then a portion of the enriched solution is heated to strip $SO_2$ as a gas. For purposes of the measurement, stripping is done at the boiling point of the solution, about 100° C. with $N_2$ sparge at 0.5 SCFH (Standard cubic feet per hour) for 4 hours. During the stripping, additional water is frequently added to make up the water loss due to evaporation. A sample of this stripped solution is analyzed for bisulfate and bisulfate concentration by the same method used to analyze the concentration of the original enriched solution. The difference in combined bisulfate and bisulfate concentrations between the stripped and enriched $SO_2$ solution is used to calculate the percent regenerability of each solution using the equation:

% Regenerability =

$$\left( 1 - \frac{\text{Total bisulfite plus bisulfate concentration in stripped solution}}{\text{Total bisulfite plus bisulfate concentration in enriched solution}} \right) \times 100$$

Percent regenerability of absorbents used in the practice of the invention is preferably at least about 30, more preferably at least about 50, most preferably at least about 60 percent.

The following examples illustrate the use of the absorbent compounds in the process of the invention. All percentages, ratios and parts are by weight unless otherwise stated.

EXAMPLES 1-5

For each of the absorbent compounds listed in Table 1, the amount of compound indicated in the Table is placed into a graduate cylinder and deionized water is added to bring the total volume to 70 ml (milliliters) at room temperature (23° C.) to form a solution. A 5/95 volume percent mixture of $SO_2$ and $N_2$ (respectively) gases is sparged through a coarse (100–150 micron) gas dispersion tube into this solution at 2.0 standard cubic feet per hour, meaning cubic feet at 60° F. at atmospheric pressure passed per hour (SCFH) for 4 hours to form an $SO_2$ enriched solution. A small sample of the $SO_2$ enriched solution is analyzed for bisulfate [$HSO_3-$] and bisulfate [$HSO_4-$] concentration using a standardized ion chromatograph commercially available from Dionex Corporation under the trade designation Dionex ™ IC Series 4000, packed with AG4/AS4 column also commercially available from Dionex Corporation, a conductivity detector commercially available from Wescant, Corp. and a Dionex anion micro membrane suppressor commercially available from Dionex Corp. under the trade designation 8080.

The sum of the sulfite and bisulfate concentrations is used to calculate the $SO_2$ capacity (mole ratio of $SO_2$/absorbent compound) as indicated in the Table.

Then, the remaining $SO_2$ enriched solution is transferred into a flask and heated to boil on a hot plate at about 100° C. with $N_2$ sparge (0.5 SCFH) for 4 hours to strip $SO_2$ as a gas. During the stripping, additional water is frequently added to make up the water loss due to evaporation. A sample of this stripped solution is analyzed for bisulfite and bisulfate concentration by the same method used to analyze the concentration of the original enriched solution. The difference in combined bisulfite and bisulfate concentration between the stripped and original (enriched) $SO_2$ solution is used to calculate the $SO_2$ percent Regenerability of each solution using the equation:

% Regenerability =

$$\left( 1 - \frac{\text{Total bisulfite plus bisulfate concentration in stripped solution}}{\text{Total bisulfite plus bisulfate concentration in enriched solution}} \right) \times 100$$

The CS is calculated, by multiplying the capacity times the concentration in moles/l, and is included in Table 1. The compounds used in Examples 1-3 are used in concentrations less than saturation; therefore the CS reported is based on those concentrations and is less than the true CS.

TABLE I

| Ex. No. | Compound | grams of compound | moles of compound | moles SO$_2$ in enriched solution | SO$_2$ capacity | Moles SO$_2$ in stripped solution | SO$_2$ regenerability % | CS* in moles SO$_2$/liter |
|---|---|---|---|---|---|---|---|---|
| 1 | Ethyl-1-piperazine carboxylate | 22.68 | 0.1419 | 0.0920 | 0.66 | 0.0460 | 50.0 | 1.34 |
| 2. | 1,4-Diformyl piperazine | 20.19 | 0.1420 | 0.0655 | 0.46 | 0.0026 | 96.1 | 0.93 |
| 3. | 1-Succinyl piperazine | 15.00 | 0.0806 | 0.0898 | 0.50 | 0.0372 | 58.6 | 0.58 |
| 4. | Glycine anhydride | 0.34 | 0.0030 | 0.0545 | 1.66 | 0.0018 | 96.7 | 0.07 |
| 5 | 1,4-dimethyl-2,5-piperazinedione | 8.00 | 0.0563 | 0.0828 | 1.47 | 0.0022 | 97.3 | 1.18 |

*The reported CS is that for the concentration used, which in the case of Examples 1-3 is less than saturation, making the reported CS less than true CS at saturation.

What is claimed is:

1. A method for removing SO$_2$ from a fluid containing SO$_2$ by employing as an absorbent for the SO$_2$, an aqueous solution of at least one compound represented by Formula I or Formula II, wherein Formula I is;

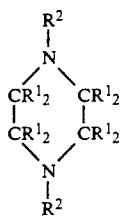

Formula I wherein each $R^1$ or $R^2$ is independently hydrogen; an alkyl group; a hydroxyalkyl group; an aldehyde group; a carboxylic acid or salt group; an alkyl group containing at least one carboxylic ester, carboxylic acid or salt, ether, aldehyde, ketone or sulfoxide; and wherein at least one $R^1$ or $R^2$ is a carbonyl-containing group, a carboxyl ester group, or a ketone-containing group and Formula II is:

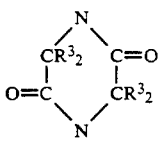

Formula II wherein each $R^3$ is independently hydrogen; an alkyl group; a hydroxyalkyl group: an aldehyde group; a carboxylic acid or salt group; or an alkyl, aryl, or aralkyl group containing at least one carboxylic ester, a carboxylic acid or salt, ether, aldehyde, ketones or sulfoxide group.

2. The process of claim 1 wherein each alkyl group has from 1 to about 6 carbon atoms.

3. The process of claim 1 wherein the compound is a compound of Formula I which is a piperazine having at least one carbonyl-containing group on the ring nitrogen and/or on the ring carbon atom.

4. The process of claim 3 wherein the compound is a piperazine containing at least one of $R^1$ or $R^2$ selected from the group consisting of alkyl groups and alkyl groups having at least one hydroxyl, carboxylic acid or salt group.

5. The process of claim 4 wherein each alkyl group has from 1 to about 6 carbon atoms.

6. The process of claim 4 wherein each $R^2$ is other than hydrogen.

7. The process of claim 6 wherein $R^2$ is selected from the group consisting of alkyl groups and alkyl groups having at least one hydroxy, carboxylic acid or salt group: and each alkyl group has from 1 to about 6 carbon atoms.

8. The process of claim 6 wherein each $R^2$ is a carbonyl-containing group.

9. The process of claim 3 wherein at least one compound is selected from the group consisting of ethyl-1-piperazine carboxylate, 1,4-diformylpiperazine, 1-succinylpiperazine, 1-(2-hydroxyethyl)-4-sulfoxylpiperazine, 1-aminoethylpiperazine, 1,4-bis(2hydroxyethyl)piperazine, 1-hydroxyethylpiperazine, 1-formylpiperazine, 1-methylpiperazine, 1,4-dimethylpiperazine, 1-piperazinecarboxylic acid, 1,4-piperazinedicarboxylic acid.

10. The process of claim 9 wherein at least one compound is selected from the group consisting of 1,4-diformylpiperazine, ethyl-1-piperazine carboxylate, and 1-succinylpiperazine.

11. The process of claim 1 wherein the compound is a compound of Formula II and each alkyl group has from 1 to about 6 carbon atoms.

12. The process of claim 11 wherein $R^3$ selected from the group consisting of hydrogen, alkyl, formyl, or alkyl group having hydroxyl, carboxylic acid or salt groups.

13. The process of claim 11 wherein at least one compound is selected from the group consisting of glycine anhydride, 1-methyl-2,5-piperazinedione: 1,4-dimethyl-2,5-piperazinedione; 1-hydroxyethyl-2,5-piperazinedione; 1-aminoethyl-2,5-piperazinedione: 1,4-bis(hydroxyethyl)-2,5-piperazinedione; 1-formyl-2,5-piperazinedione, 1,4-bis(hydroxyethyl)-2,5-piperazinedione; 1-formyl-2,5-piperazinedione, 1-acetyl-2,5-piperazinedione; 1-carbethoxy-2,5-piperazinedione; 1-(carboxymethyl)-2,5-piperazinedione: 3-hydroxyethyl-2,5-piperazinedione; 3,6-bis-hydroxyethyl)-2,5-piperazinedione: 3-methyl-2,5-piperazineidone; and 3-formyl-2,5-piperazinedione.

14. The process of claim 12 wherein at least one compound is selected from the group consisting of glycine anhydride and 1,4-dimethyl-2,5-piperazinedione.

15. The process of claim 1 wherein the aqueous solution contains a concentration of the absorbent compound of at least 0.1 weight percent.

16. The process of claim 1 wherein the absorption of SO$_2$ from the fluid is conducted at a temperature of from about 0° C. to about 120° C.

17. The process of claim 16 wherein the temperature is from about 5° C. to about 60° C.

18. The process of claim 1 wherein after absorption of $SO_2$ by the aqueous solution, $SO_2$ is removed from the aqueous solution by heating the solution to a temperature of from about 75° C. to about 150° C.

19. The process of claim 18 wherein the temperature is from about 90° C. to about 120° C.

20. The process of claim 15 wherein the absorbent has a percent regenerability of at least about 50 percent.

21. The process of claim 1 wherein fluid has a $SO_2$ concentration of from 1 ppm by volume up to about 100 volume percent of the fluid.

22. The process of claim 21 wherein the $SO_2$ concentration is from about 100 ppm to about 3000 ppm by volume of the fluid.

* * * * *